United States Patent [19]

Phillion et al.

[11] Patent Number: 5,662,351
[45] Date of Patent: Sep. 2, 1997

[54] AIR BAG DEPLOYMENT DOOR

[75] Inventors: Jack A. Phillion, Shelby Township; Thomas J. Hawkins, Kentwood, both of Mich.

[73] Assignees: TRW Vehicle Safety Systems Inc., Lyndhurst, Ohio; Lacks Industries, Inc., Grand Rapids, Mich.

[21] Appl. No.: 517,337

[22] Filed: Aug. 21, 1995

[51] Int. Cl.⁶ .................................................. B60R 21/16
[52] U.S. Cl. ........................................ 280/728.3; 280/732
[58] Field of Search ............................. 280/728.1, 728.3, 280/731, 732

[56] References Cited

U.S. PATENT DOCUMENTS

| | | | |
|---|---|---|---|
| 5,031,930 | 7/1991 | Sato | 280/732 |
| 5,158,322 | 10/1992 | Sun | 280/732 |
| 5,183,289 | 2/1993 | Zeller et al. | 280/731 |
| 5,306,040 | 4/1994 | Leonelli et al. | 280/732 |
| 5,342,086 | 8/1994 | Harris et al. | 280/731 |
| 5,433,473 | 7/1995 | Hiramitsu et al. | 280/731 |
| 5,524,922 | 6/1996 | Soderquist | 280/728.3 |

FOREIGN PATENT DOCUMENTS

2270886   3/1994   United Kingdom ............... 280/728.3

Primary Examiner—Paul N. Dickson
Attorney, Agent, or Firm—Tarolli, Sundheim, Covell, Tummino & Szabo

[57] ABSTRACT

A deployment door (24) for an inflatable air bag (18) has a door panel (80), a hinge (84), and first and second stress risers (128,192). The first stress riser (128) ruptures under stress induced in the door panel (80) upon movement of the air bag (18) forcefully against the door panel (80). The hinge (84) supports the door panel (80) for pivotal movement about an axis (190) when the first stress riser (128) has been ruptured. The hinge (84) includes a pivotal hinge leaf (150) having opposite side edges (180,182). One of the side edges (180) extends alongside the axis (190). The other side edge (182) is skewed relative to the axis (190). The second stress riser (192) ruptures under stress induced in the pivotal hinge leaf (150) when the door panel (80) pivots about the axis (190).

31 Claims, 6 Drawing Sheets

AIR BAG DEPLOYMENT DOOR

FIELD OF THE INVENTION

The present invention relates to a deployment door which is opened upon inflation of an air bag in a vehicle.

BACKGROUND OF THE INVENTION

An air bag is inflated to protect an occupant of a vehicle upon the occurrence of a vehicle collision. When the vehicle experiences a collision-indicating condition of at least a predetermined threshold level, an inflator is actuated. The inflator then emits inflation fluid which is directed to flow into the air bag. The inflation fluid inflates the air bag to an inflated condition in which the air bag extends into the vehicle occupant compartment. When the air bag is inflated into the vehicle occupant compartment, it restrains an occupant of the vehicle from forcefully striking parts of the vehicle as a result of the collision.

The air bag and the inflator are typically assembled together as parts of an air bag module. In addition to the air bag and the inflator, the module includes a reaction canister which contains and supports the air bag and the inflator in the vehicle. The reaction canister has a deployment opening through which the air bag moves outward from the reaction canister when the air bag is inflated. A deployment door extends over the deployment opening to conceal the air bag and the other parts of the module from the vehicle occupant compartment.

When the inflator is actuated, the reaction canister directs the inflation fluid to flow from the inflator into the air bag. As the inflation fluid enters the air bag, it moves the air bag outward through the deployment opening and forcefully against the deployment door. The deployment door is ruptured by the force of the fluid pressure in the air bag, and is thus released for movement away from the deployment opening. As the air bag continues to move outward against the deployment door, it forcefully deflects a hinge portion of the deployment door so as to move the deployment door pivotally away from the deployment opening. The deployment door is thus opened and moved pivotally out of the path of the air bag as the air bag inflates outward from the reaction canister through the deployment opening and into the vehicle occupant compartment.

SUMMARY OF THE INVENTION

In accordance with the present invention, an apparatus for use with an inflatable vehicle occupant restraint, such as an air bag, comprises a deployment door panel, means for defining a first stress riser, and hinge means. The first stress riser is rupturable under stress induced in the door panel upon movement of the air bag forcefully against the door panel. The hinge means supports the door panel for pivotal movement about an axis when the first stress riser has been ruptured. The hinge means includes a pivotal hinge leaf having opposite side edges. One of the side edges of the pivotal hinge leaf extends alongside the axis. The other side edge of the pivotal hinge leaf is skewed relative to the axis. The hinge means further includes means for defining a second stress riser. The second stress riser is rupturable under stress induced in the pivotal hinge leaf when the door panel pivots about the axis.

In a preferred embodiment of the present invention, the door panel has a curved contour which is complimentary to the curved contour of a vehicle part in which the apparatus is mounted. The side edge of the pivotal hinge leaf that extends alongside the axis is an inner side edge which is spaced from the door panel. The side edge of the pivotal hinge leaf that is skewed relative to the axis is an outer side edge which extends alongside the door panel. The inner and outer side edges of the pivotal hinge leaf are thus skewed relative to each other as a result of the curved contour of the door panel. The second stress riser extends along the inner side edge.

The skewed relationship of the inner and outer side edges of the pivotal hinge leaf causes an imbalance in stresses that are induced in the pivotal hinge leaf when the door panel pivots about the axis. However, in accordance with the present invention, stress in the pivotal hinge leaf is relieved upon rupturing of the second stress riser so that the imbalance in stresses is alleviated. Additionally, energy is dissipated upon rupturing of the second stress riser. The second stress riser thus helps to ensure that the apparatus is not undesirably broken by the force of the air bag moving against the door panel.

BRIEF DESCRIPTION OF THE DRAWINGS

Further features of the present invention will become apparent to those skilled in the art to which the present invention relates from reading the following description with reference to the accompanying drawings, in which.

DESCRIPTION OF PREFERRED EMBODIMENTS

Figure 1:
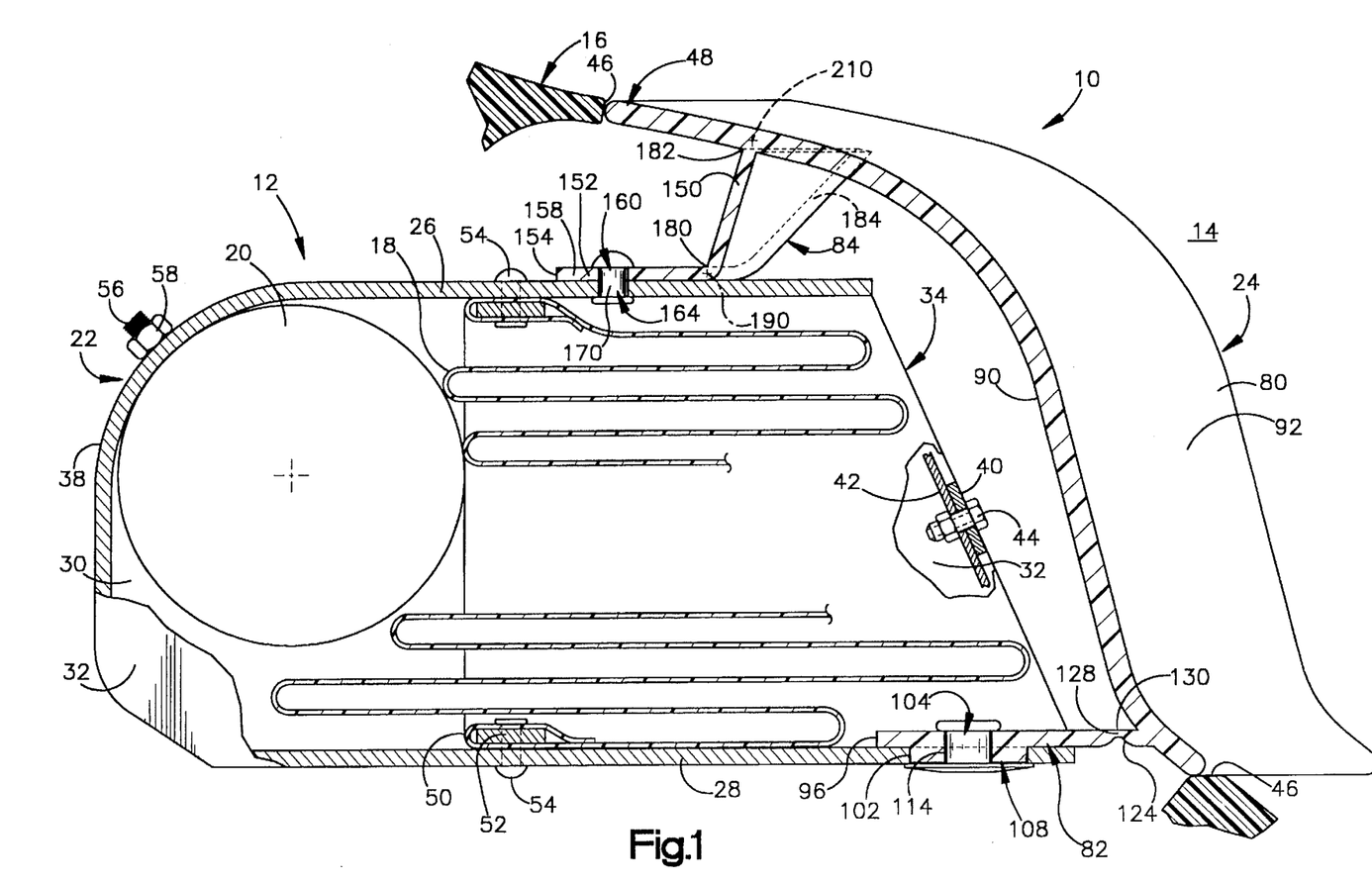
FIG. 1 is a schematic view of a vehicle occupant restraint apparatus comprising a first embodiment of the present invention.

As shown in FIG. 1, a vehicle occupant restraint apparatus 10 comprising a first embodiment of the present invention includes an air bag module 12. The air bag module 12 is mounted in a vehicle at a location adjacent to the vehicle occupant compartment 14, such as in the instrument panel 16 at the passenger side of the vehicle. The air bag module 12 includes an inflatable vehicle occupant restraint 18, which is commonly referred to as an air bag, and includes an inflator 20 for inflating the air bag 18.

Figure 2:
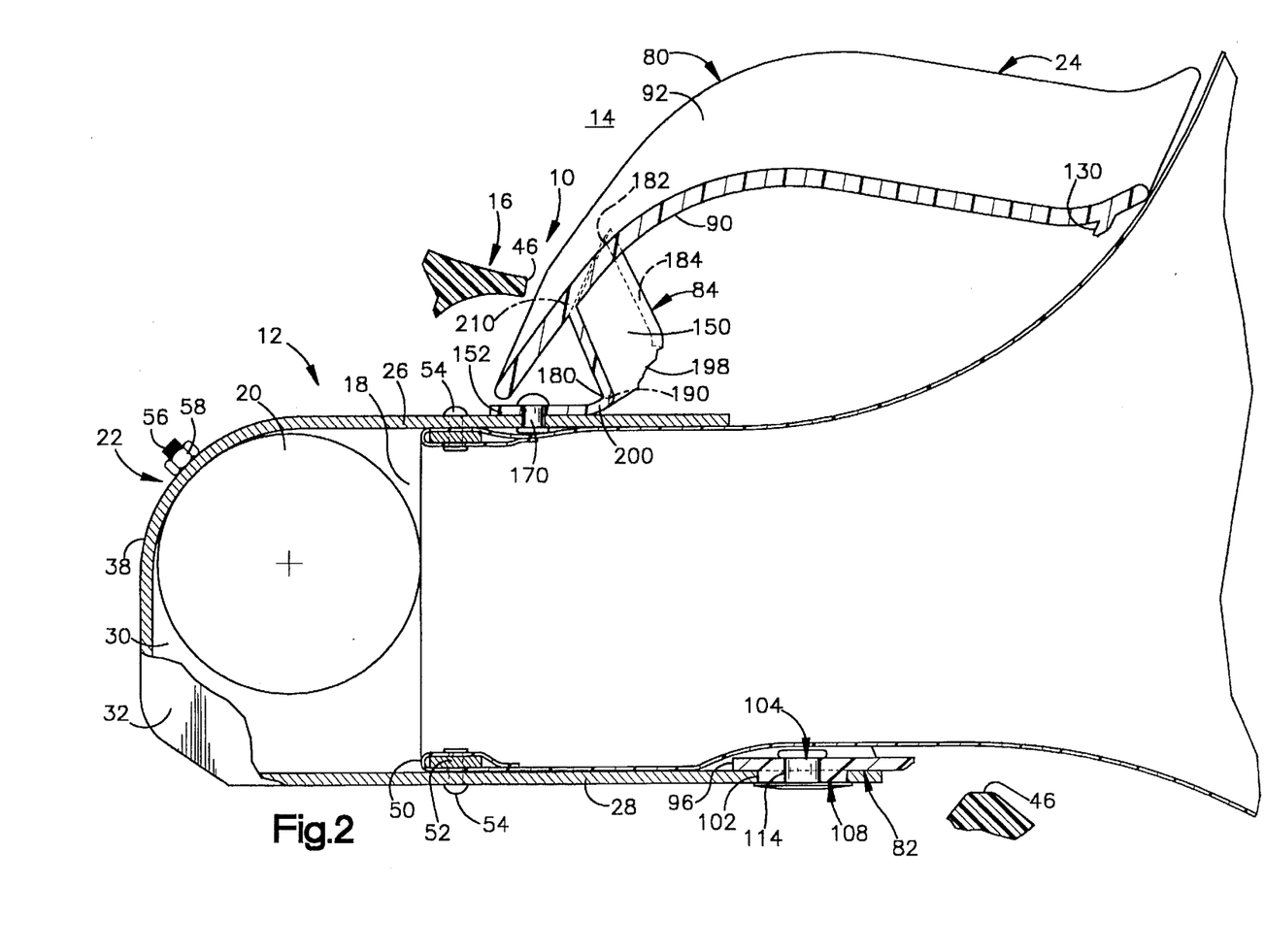
FIG. 2 is a view showing the apparatus of FIG. 1 in an actuated condition.

When the inflator 20 is actuated, it inflates the air bag 18 from an uninflated condition, as shown fully in FIG. 1, to an inflated condition, as shown partially in FIG. 2. When the air bag 18 is in the inflated condition, it extends from the instrument panel 16 into the vehicle occupant compartment 14 to restrain movement of a vehicle occupant toward the instrument panel 16. The air bag 18 thus helps to protect the occupant from a forceful impact with the instrument panel 16 or other parts of the vehicle.

The air bag module 12 further includes a reaction canister 22 and a deployment door 24. The reaction canister 22 contains the air bag 18 and the inflator 20. The deployment door 24 is mounted on the reaction canister 22, and conceals the other parts of the air bag module 12 from the vehicle occupant compartment 14.

The reaction canister 22 has an upper wall 26, a lower wall 28, and a pair of opposite side walls 30 and 32. The upper, lower, and side walls 26, 28, 30 and 32 of the reaction canister 22 together define a deployment opening 34 at the outer end of the reaction canister 22. An inner wall 38 closes the inner end of the reaction canister 22 opposite the deployment opening 34.

A plurality of mounting tabs 40, one of which is shown in FIG. 1, project from the reaction canister 22. The mounting tabs 40 are fixed to corresponding supporting parts 42 of the instrument panel 16 by fasteners 44. The structure and arrangement of the fasteners 44, the mounting tabs 40, and the supporting parts 42 of the instrument panel 16 can vary, as known in the art. The reaction canister 22 is mounted in the instrument panel 16 in a position in which the deployment opening 34 is closely spaced from a surrounding edge surface 46 of the instrument panel 16. The deployment opening 34 is thus located within a larger opening 48 defined by the edge surface 46 of the instrument panel 16. Although the reaction canister 22 in the preferred embodiments of the present invention is a separate structure which is mounted in the instrument panel 16, such a canister could alternatively be defined by the structure of the instrument panel 16, or by another part of the vehicle from which the air bag 18 is to be inflated into the vehicle occupant compartment 14.

As noted above, the air bag 18 is contained in the reaction canister 22 in the uninflated condition of FIG. 1. An open inner end portion 50 of the air bag 18 is wrapped around and secured to a retainer ring 52 in a known manner. The retainer ring 52 extends fully around the inside of the reaction canister 22 at a location between the inflator 20 and the deployment opening 34. A plurality of fasteners 54 securely fasten the retainer ring 52, and hence the inner end portion 50 of the air bag 18, to the surrounding walls 26, 28, 30 and 32 of the reaction canister 22 at that location.

The inflator 20 is an elongated cylindrical structure comprising a source of inflation fluid for inflating the air bag 18. As known in the art, the inflator 20 may contain an ignitable gas generating material which, when ignited, rapidly generates a large volume of gas. The inflator 20 may alternatively contain a stored quantity of pressurized inflation fluid, or a combination of pressurized inflation fluid and ignitable material for heating the inflation fluid.

The inflator 20 extends longitudinally between the opposite side walls 30 and 32 of the reaction canister 22. A threaded mounting stud 56 on the inflator 20 projects radially outward through an opening (not shown) in the inner wall 38 of the reaction canister 22. A nut 58 on the mounting stud 56 attaches the inflator 20 securely to the reaction canister 22. Alternatively, the inflator 20 could be mounted in the reaction canister 22 by any other suitable mounting structure known in the art.

Figures 3, 4:
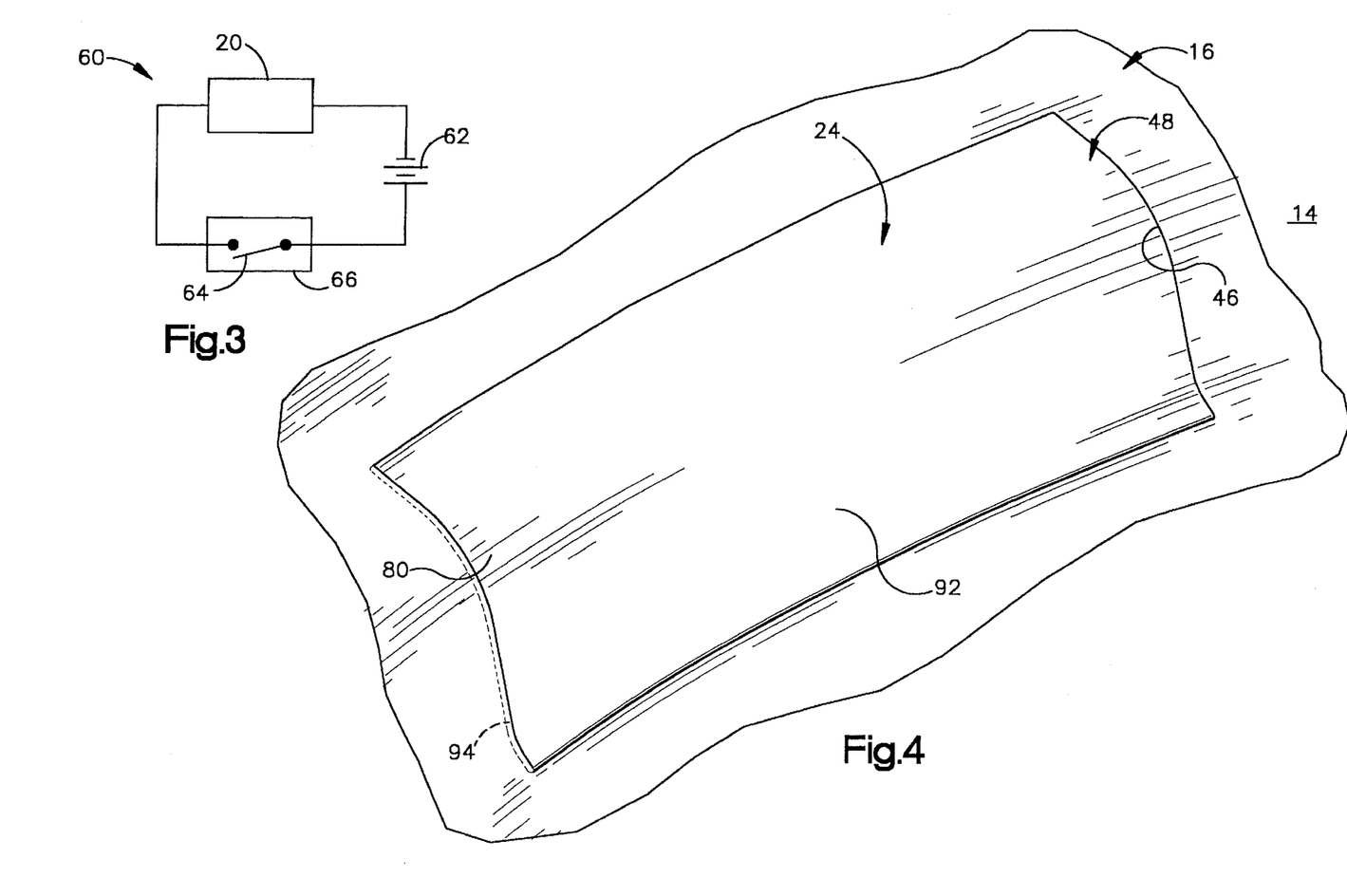
FIG. 3 is a schematic view of an electrical circuit including a part of the apparatus of FIG. 1.
FIG. 4 is a perspective view of parts of the apparatus of FIG. 1.
Figure 5:
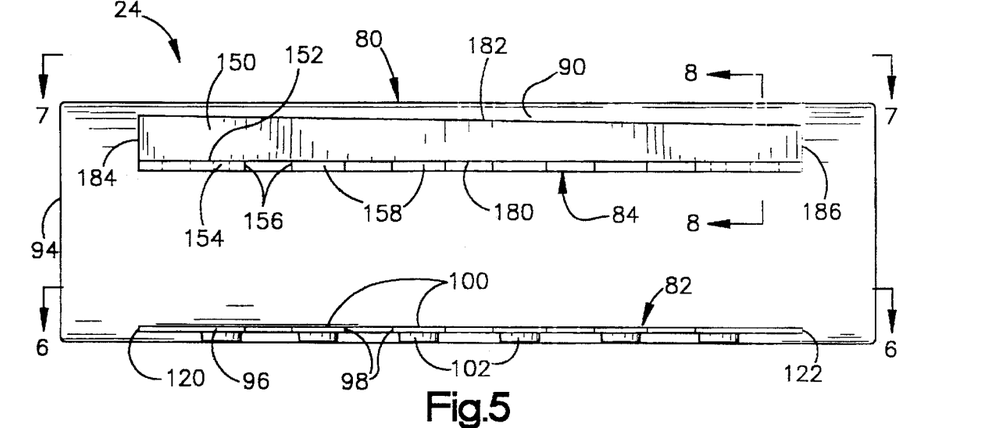
FIG. 5 is a rear view of a part of the apparatus of FIG. 1.

As shown in FIG. 3, the inflator 20 is included in an electrical circuit 60. The electrical circuit 60 further includes a power source 62, which is preferably the vehicle battery and/or a capacitor, and a normally open switch 64. The switch 64 is part of a sensor 66 which senses a condition indicating the occurrence of a vehicle collision. The collision-indicating condition may comprise, for example, sudden vehicle deceleration caused by a collision. If the collision-indicating condition is above a predetermined threshold, it indicates the occurrence of a collision for which inflation of the air bag 18 is desired to protect an occupant of the vehicle. The sensor 66 then closes the switch 64, and the inflator 20 is actuated electrically.

When the inflator 20 is actuated, it emits a large volume of inflation fluid into the reaction canister 22. The reaction canister 22 directs the inflation fluid from the inflator 20 into the air bag 18 to inflate the air bag 18 from the uninflated condition of FIG. 1 to the inflated condition of FIG. 2. As the air bag 18 begins to inflate, it moves rapidly outward from the reaction canister 22 through the deployment opening 34. The air bag 18 then moves forcefully against the deployment door 24 to open the deployment door 24, and continues to move outward into the vehicle occupant compartment 14 past the deployment door 24.

As shown with the instrument panel 16 in FIG. 4, the deployment door 24 in the preferred embodiment of the present invention has a generally rectangular shape which is elongated horizontally. As shown separately in FIGS. 5–8, the deployment door 24 is a unitary plastic part with a plurality of distinct portions including a door panel 80, a lower flange 82, and an upper flange 84.

The door panel 80 has an inner side surface 90 facing inward toward the reaction canister 22 (FIG. 1), and has an outer side surface 92 facing outward toward the vehicle occupant compartment 14. The inner and outer side surfaces 90 and 92 are coextensive with each other and are bounded by a peripheral edge surface 94 which extends entirely around the door panel 80. The peripheral edge surface 94 closely follows the contour of the edge surface 46 of the instrument panel 16. The door panel 80 thus extends fully across the opening 48 in the instrument panel 16, as shown in FIG. 4. Additionally, the door panel 80 has a curved contour such that the outer side surface 92 continues the curved contour of the instrument panel 16 across the opening 48. In the preferred embodiment of the present invention shown in the drawings, the outer side surface 92 extends vertically across the opening 48 with a generally S-shaped contour (FIG. 1), and extends horizontally across the opening 48 with a concave contour (FIGS. 6 and 7) facing outward toward the vehicle occupant compartment 14.

The lower flange 82 on the deployment door 24 projects inward from the door panel 80 near the bottom of the door panel 80. An inner edge 96 of the lower flange 82 extends along the length of the lower flange 82, and has a plurality of recessed portions 98. The recessed portions 98 of the inner edge 96 extend between a plurality of mounting tabs 100 which are spaced apart along the length of the lower flange 82. Each mounting tab 100 has a downwardly projecting cylindrical boss 102, and has an aperture 104 centered on the boss 102. The bosses 102 and the apertures 104 are centered together on a straight line 106 which extends along the length of the lower flange 82. When the deployment door 24 is mounted on the reaction canister 22, as shown in FIG. 1, each boss 102 on the lower flange 82 is closely received in a corresponding aperture 108 in the lower wall 28 of the reaction canister 22. Each aperture 104 in the lower flange 82 receives a corresponding fastener 114 such that the lower flange 82 on the deployment door 24 is fastened securely to the lower wall 28 of the reaction canister 22.

Figure 6:
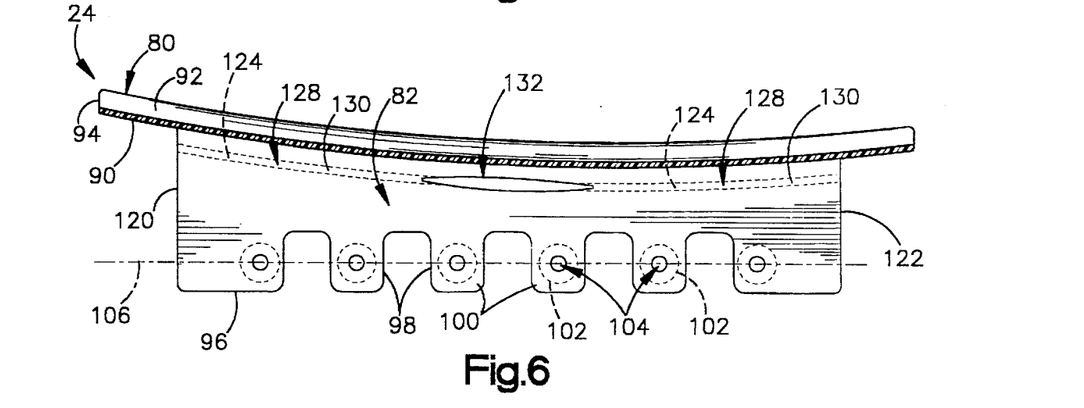
FIG. 6 is a view taken on line 6—6 of FIG. 5.

As best shown in FIG. 6, the opposite ends of the lower flange 82 are defined by first and second end edges 120 and 122. The end edges 120 and 122 extend inward from the inner side surface 90 of the door panel 80 and are perpendicular to the line 106. As further shown in FIG. 6, the door panel 80 is skewed relative to the line 106. This is a result of the curvature of the instrument panel 16 and the complementary curvature of the door panel 80, as described above. Therefore, the first end edge 120 of the lower flange 82 is substantially longer than the second end edge 122.

An elongated recessed surface 124 (FIG. 1) of the lower flange 82 extends along the lower flange 82 adjacent to the door panel 80. An elongated stress riser 128 is defined by the relatively thin plastic material of the lower flange 82 which is located between the recessed surface 124 and an opposite surface 130. The stress riser 128 is rupturable under stress of at least a predetermined elevated level. A generally slot-shaped initiator opening 132 (FIG. 6) extends through the lower flange 82. The initiator opening 132 interrupts the stress riser 128 approximately midway along the length of the lower flange 82. The stress riser 128 thus extends longitudinally in opposite directions from the initiator opening 132 to the opposite end edges 120 and 122 of the lower flange 82. Although the foregoing structure of the stress riser 128 is preferred, any other suitable structure for defining one or more stress risers and/or one or more initiator openings can be used as an alternative.

The upper flange 84 on the deployment door 24 also projects inward from the door panel 80. An inclined portion 150 of the upper flange 84 projects inward from the inner side surface 90 of the door panel 80. A horizontal portion 152 of the upper flange 84 projects inward from the inclined portion 150.

Figure 7:
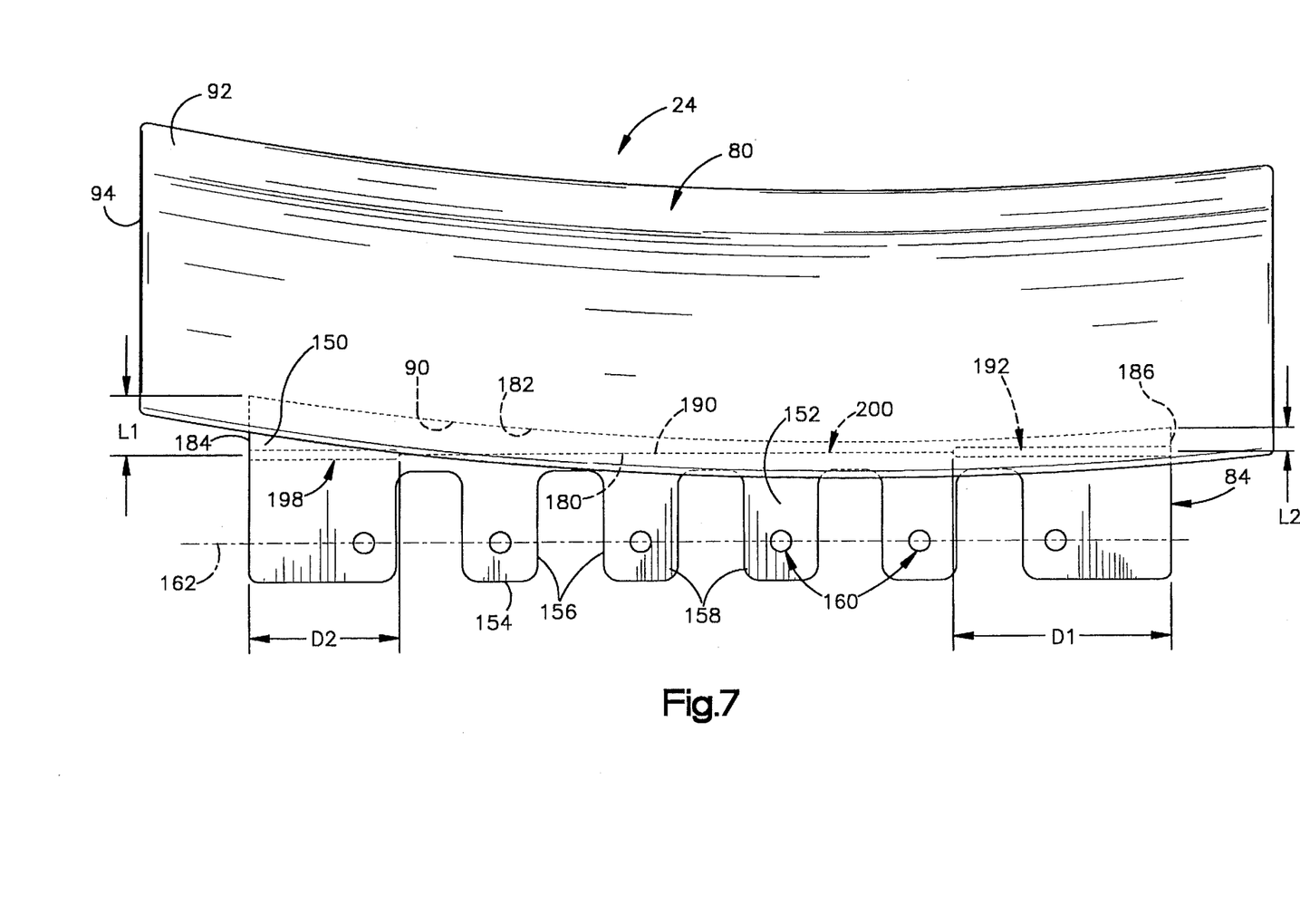
FIG. 7 is a view taken on line 7—7 of FIG. 5.

As shown in FIG. 7, the horizontal portion 152 of the upper flange 84 has an inner edge 154. The inner edge 154 extends along the length of the upper flange 84, and has a plurality of recessed portions 156. The recessed portions 156 of the inner edge 154 extend between a plurality of mounting tabs 158 which are spaced apart along the length of the upper flange 84. A plurality of apertures 160 extending through the mounting tabs 158 are centered on a straight line 162. The straight line 162 at the upper flange 84 is parallel to the straight line 106 (FIG. 6) at the lower flange 82. When the deployment door 24 is mounted on the reaction canister 22, as shown in FIG. 1, each aperture 160 in the upper flange 84 is aligned with a corresponding aperture 164 in the upper wall 26 of the reaction canister 22. A plurality of fasteners 170, one of which is shown in FIG. 1, are received through the aligned apertures 160 and 164 to fasten the upper flange 84 on the deployment door 24 securely to the upper wall 26 of the reaction canister 22.

The inclined portion 150 of the upper flange 84 has inner and outer side edges 180 and 182 extending between a pair of opposite end edges 184 and 186. As best shown in FIG. 7, the end edges 184 and 186 are perpendicular to the line 162. The inner side edge 180 is spaced from the door panel 80, and extends between the end edges 184 and 186 in a straight line which is parallel to the line 162. The outer side edge 182 extends alongside the door panel 80. Therefore, the outer side edge 182 extends between the opposite end edges 184 and 186 in a curve defined by the curvature of the door panel 80. The outer side edge 182 is thus skewed relative to the inner side edge 180. As a result, the length L1 of the first end edge 184 is substantially longer than the length L2 of the second end edge 186.

As described above, the air bag 18 moves outward against the deployment door 24 when the air bag 18 is being inflated from the condition of FIG. 1 toward the condition of FIG. 2. The inflation fluid in the air bag 18 then causes the air bag 18 to apply a fluid pressure force to the inner side surface 90 of the door panel 80. Some components of the fluid pressure force are transmitted within the deployment door 24 from the door panel 80 to the lower flange 82. This induces stress in the stress riser 128. When the stress reaches the predetermined elevated level, the stress riser 128 ruptures fully along its entire length. The door panel 80 is thus released from the lower flange 82.

As the air bag 18 continues to inflate, it opens the door panel 80 from the position of FIG. 1 to the position of FIG. 2. The upper flange 84 then acts as a hinge which guides such movement of the door panel 80. Specifically, the horizontal portion 152 of the upper flange 84 acts as a stationary hinge leaf. The inclined portion 150 acts as a pivotal hinge leaf. The two portions 150 and 152 of the upper flange 84 together define a pivotal axis 190 about which the inclined portion 150 and the door panel 80 pivot from the position of FIG. 1 to the position of FIG. 2.

As shown in FIG. 7, the pivotal axis 190 extends along the length of the upper flange 84 at the juncture of the inclined portion 150 and the horizontal portion 152. The inner side edge 180 of the inclined portion 150 thus extends in a straight line alongside the pivotal axis 190. The outer side edge 182 of the inclined portion 150, which is skewed relative to the inner side edge 180, is also skewed relative to the pivotal axis 190. The opposite ends of the outer side edge 182 are thus spaced unequal distances (L1 and L2) from the pivotal axis 190 as a result of the curvature of the door panel 80.

The material of the upper flange 84 is deflected and stressed by the fluid pressure force applied to the door panel 80 when the inflating air bag 18 pivots the door panel 80 about the axis 190 toward the position of FIG. 2. The inclined portion 150 of the upper flange 84 is then deflected and stressed along its length between the opposite end edges 184 and 186, and is also deflected and stressed across its width between the inner and outer side edges 180 and 182. Since the outer side edge 182 is skewed relative to the inner side edge 180 and the axis 190, the stresses vary along the length of the inclined portion 150. More specifically, the stresses near the second end edge 186 are substantially greater than the stresses near the first end edge 184 because the width of the inclined portion 150 at the second end edge 186 is substantially less than the width at the first end edge 184.

Figure 8:
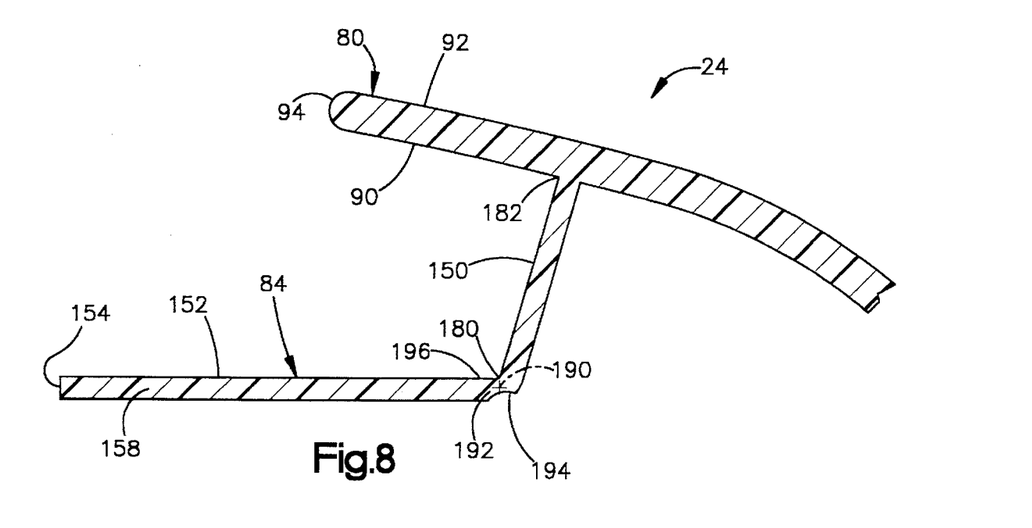
FIG. 8 is a view taken on line 8—8 of FIG. 5.

In order to alleviate the foregoing imbalance in stresses between the opposite ends of the upper flange 84, a stress riser 192 is provided in the upper flange 84. As shown in FIG. 8, the stress riser 192 is defined by the relatively thin plastic material of the upper flange 84 which is located between an elongated recessed surface 194 and an opposite surface 196. As shown in FIG. 7, the stress riser 192 begins at the second end edge 186 of the inclined portion 150 of the upper flange 84, and extends a distance D1 along the inner side edge 180. The stress riser 192 thus extends alongside the portion of the axis 190 where the greatest stresses arise upon pivotal movement of the door panel 80 about the axis 190. Those stresses cause the stress riser 192 to rupture fully along its entire length. As a result, stress is relieved in a controlled amount. The imbalance in stresses between the opposite ends of the upper flange 84 is thus alleviated in a controlled amount.

Another stress riser 198 is preferably included at the opposite end of the upper flange 84, as shown in FIG. 7. The other stress riser 198 ruptures in the same manner as the stress riser 192, but extends a shorter distance D2 along the inner side edge 180. The differing distances D1 and D2 are predetermined so as to cause correspondingly differing amounts of stress to be relieved upon rupturing of the two stress risers 192 and 198. The imbalance in stresses between the opposite ends of the upper flange 84 is alleviated accordingly.

When the stress risers 192 and 198 in the upper flange 84 have been ruptured in the foregoing manner, a living hinge portion 200 of the upper flange 84 is defined along the pivotal axis 190 between the ruptured stress risers 192 and 198. The plastic material of the upper flange 84 continues to bend along the length of the living hinge 200 as the inclined portion 150 of the upper flange 84 continues to pivot about the axis 190 toward the position of FIG. 2. Since the imbalance in stresses has then been alleviated as described above, the plastic material bends more evenly along the length of the living hinge 200. The inclined portion 150 of the upper flange 84 then pivots more evenly along the length of the living hinge 200 without twisting excessively. The door panel 80 likewise pivots about the axis 190 more evenly along its length without twisting excessively.

Additionally, when the stress risers 192 and 198 are ruptured along their lengths by the fluid pressure force of the inflating air bag 18, forces act through distances such that work is performed and energy is dissipated. Therefore, in addition to alleviating an imbalance in stresses to promote even pivotal movement of the door panel 80 about the axis 190, the stress risers 192 and 198 further serve to dissipate energy such that undesirable breakage in the deployment door 24 is avoided.

As further shown in FIG. 2, the door panel 80 and the upper flange 84 are also deflected relative to each other at the juncture of the door panel 80 and the upper flange 84. The door panel 80 and the inclined portion 150 of the upper flange 84 are thus moved pivotally about a second pivotal axis 210 which extends along the length of the outer side edge 182 of the inclined portion 150. One or more stress risers like the stress risers 192 and 198 could be provided at the outer side edge 182 to relieve stresses at the second pivotal axis 210, as desired.

Figure 9:
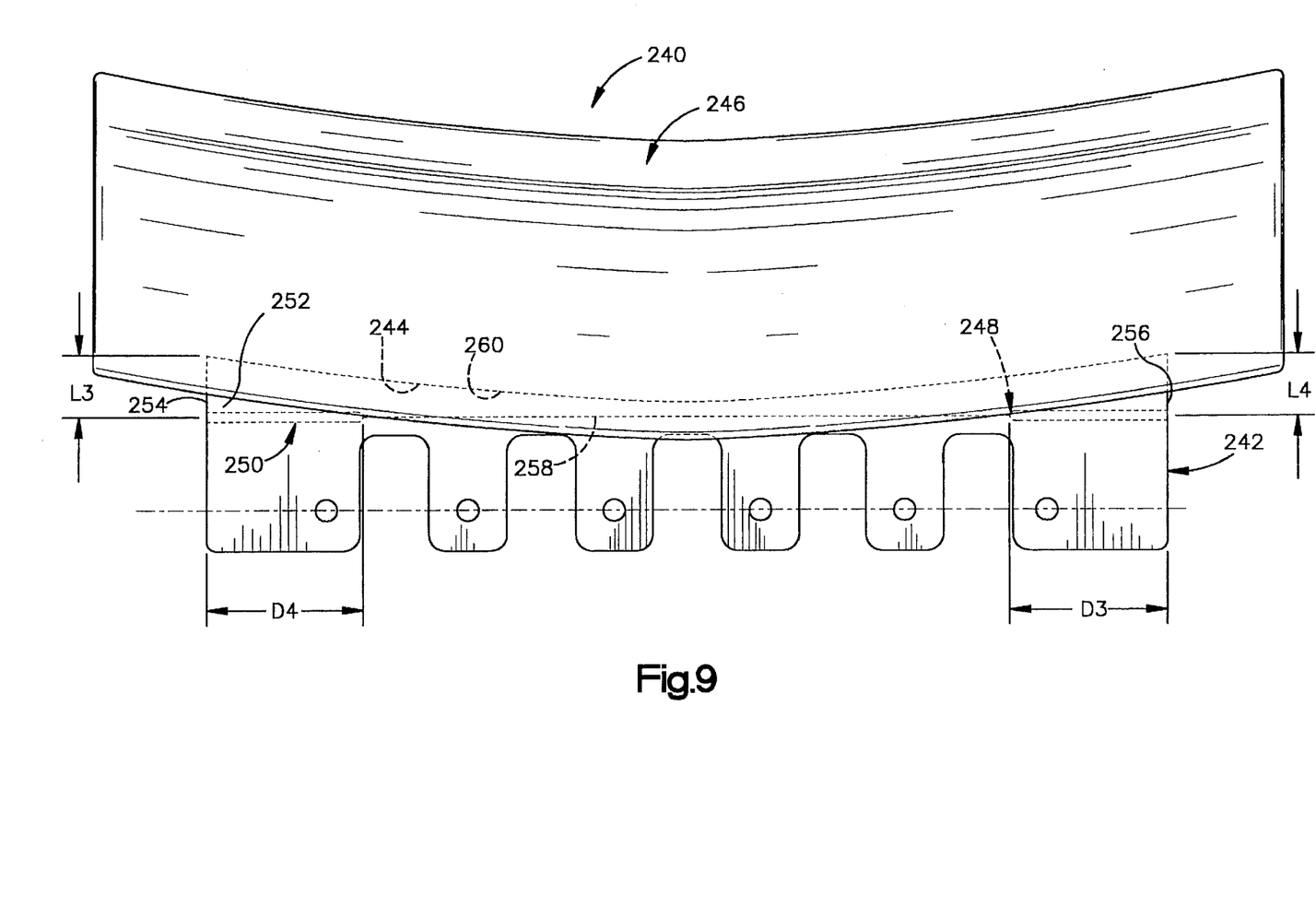
FIG. 9 is a view similar to FIG. 7 showing a part of a vehicle occupant restraint apparatus comprising a second embodiment of the present invention.

As shown partially in FIG. 9, a second embodiment of the present invention includes a deployment door 240. The partial view of the deployment door 240 shown in FIG. 9 corresponds with the partial view of the deployment door 24 shown in FIG. 7. The deployment door 240 is thus shown to have an upper flange 242 projecting from an inner side surface 244 of a curved door panel 246.

Like the upper flange 84 on the deployment door 24 described above, the upper flange 242 on the deployment door 240 has a pair of stress risers 248 and 250 extending distances D3 and D4, respectively, from corresponding opposite ends of the upper flange 242. Further like the upper flange 84, the upper flange 242 has an inclined portion 252 with opposite end edges 254 and 256. The opposite end edges 254 and 256 have lengths L3 and L4, respectively, between a pair of skewed opposite side edges 258 and 260 of the inclined portion 254. However, the curvature of the door panel 246 differs from the curvature of the door panel 80 described above. Specifically, the curvature of the door panel 246 is such that the lengths L3 and L4 are equal, rather than unequal, to each other. The distances D3 and D4 also are equal, rather than unequal, to each other. If the deployment door 240 were provided with stress risers at a second pivotal axis, as described above with reference to the second pivotal axis 210, such additional stress risers also would preferably be equal in length in accordance with this feature of the present invention.

The present invention has been described with reference to preferred embodiments. From the foregoing description of the invention, those skilled in the art will perceive improvements, changes and modifications. For example, the shape and size of the deployment door could vary. The deployment door could have a different location on the instrument panel, such as a top-mount location. Moreover, a vehicle occupant restraint system may include one or more air bags that inflate upon the occurrence of front, rear, and/or side impacts to the vehicle. The air bags can be mounted in parts of the vehicle other than the instrument panel. Such other parts of the vehicle include, for example, the steering column, the doors, the pillars, the roof, and the seats. A deployment door constructed in accordance with the present invention could be used with an air bag at any of those locations. Such improvements, changes and modifications within the skill of the art are intended to be covered by the appended claims.

Having described the invention, the following is claimed:

1. Apparatus for use with an inflatable vehicle occupant restraint, said apparatus comprising:

a deployment door panel;

means for defining a first stress riser which is rupturable under stress induced in said door panel upon movement of the restraint forcefully against said door panel; and hinge means for supporting said door panel for pivotal movement about an axis when said first stress riser has been ruptured, said hinge means including a pivotal hinge leaf having opposite side edges, one of said side edges extending alongside said axis, the other of said side edges being skewed relative to said axis;

said hinge means further including means for defining a second stress riser which is separate and spaced fully from said first stress riser and which is rupturable under stress induced in said pivotal hinge leaf upon said pivotal movement of said door panel about said axis.

2. Apparatus as defined in claim 1 wherein said opposite side edges of said hinge leaf extend longitudinally between opposite ends of said hinge leaf, said second stress riser beginning at one of said ends of said hinge leaf and extending along one of said side edges toward the other of said ends.

3. Apparatus as defined in claim 2 wherein said one of said side edges is an inner side edge which is spaced from said door panel, said other of said side edges being an outer side edge which extends alongside said door panel.

4. Apparatus as defined in claim 3 wherein said one of said side edges is straight along its entire length, said other of said side edges being curved along its entire length.

5. Apparatus as defined in claim 1 wherein said second stress riser is one of a pair of stress risers extending along said one of said side edges from opposite ends of said one of said side edges.

6. Apparatus as defined in claim 5 wherein said opposite ends of said one of said side edges are equally spaced from the other of said side edges in a direction perpendicular to said axis, said pair of stress risers being equal in length.

7. Apparatus as defined in claim 1 wherein said deployment door panel and said hinge means are portions of a unitary plastic part.

8. Apparatus for use with an inflatable vehicle occupant restraint, said apparatus comprising:

a deployment door panel having inner and outer side surfaces with curved contours;

means for defining a first stress riser which is rupturable under stress induced in said door panel upon movement of the restraint forcefully outward against said inner side surface of said door panel; and hinge means for supporting said door panel for pivotal movement about an axis when said first stress riser has been ruptured, said hinge means including a pivotal hinge leaf having opposite ends and inner and outer side edges extending longitudinally between said opposite ends, said inner side edge extending in a straight line alongside said axis, said outer side edge extending in a curve alongside said inner side surface of said door panel;

said hinge means further including means for defining a second stress riser which is rupturable under stress induced in said pivotal hinge leaf upon said pivotal movement of said door panel about said axis, said second stress riser beginning at one of said ends of said pivotal hinge leaf and extending along said inner side edge of said pivotal hinge leaf in a straight line parallel to said axis.

9. Apparatus as defined in claim 8 further comprising canister means for containing and supporting the restraint in a vehicle, said pivotal hinge leaf being fully defined by a flange which projects inward from said inner side surface of said door panel to said canister means, said flange comprising means for receiving fasteners which connect said flange to said canister means.

10. Apparatus for use with an inflatable vehicle occupant restraint, said apparatus comprising:

a deployment door panel;

means for defining a first stress riser which is rupturable under stress induced in said door panel upon movement of the restraint forcefully against said door panel; and hinge means for supporting said door panel for pivotal movement about an axis when said first stress riser has been ruptured, said hinge means including a pivotal hinge leaf having opposite side edges, one of said side edges extending alongside said axis, the other of said side edges being skewed relative to said axis;

said hinge means further including means for defining a second stress riser which is rupturable under stress induced in said pivotal hinge leaf upon said pivotal movement of said door panel about said axis;

said second stress riser being one of a pair of stress risers extending along said one side edge of said pivotal hinge leaf from opposite ends of said one side edge;

said opposite ends of said one side edge being unequally spaced from said other side edge in a direction perpendicular to said axis, said pair of stress risers being unequal in length.

11. Apparatus for use with an inflatable vehicle occupant restraint, said apparatus comprising:

a deployment door panel having inner and outer side surfaces with curved contours;

means for defining a first stress riser which is rupturable under stress induced in said door panel upon movement of the restraint forcefully outward against said inner side surface of said door panel; and hinge means for supporting said door panel for pivotal movement about an axis when said first stress riser has been ruptured, said hinge means including a pivotal hinge leaf having an inner edge extending in a straight line alongside said axis and an outer edge extending in a curve alongside said inner side surface of said door panel;

said hinge means further including means for defining a second stress riser which is rupturable under stress induced in said pivotal hinge leaf upon said pivotal movement of said door panel about said axis, said second stress riser extending along said inner edge of said pivotal hinge leaf;

said second stress riser being one of a pair of stress risers extending along said inner edge of said pivotal hinge leaf from opposite ends of said inner edge;

said opposite ends of said inner edge of said pivotal hinge leaf being unequally spaced from said door panel in a direction perpendicular to said axis, said pair of stress risers being unequal in length.

12. Apparatus for use with an inflatable vehicle occupant restraint contained in a canister in a vehicle, said apparatus comprising:

a pivotal deployment door panel having oppositely facing inner and outer side surfaces; and a mounting flange projecting inward from said inner side surface of said door panel, said mounting flange having means for connection of said mounting flange to the canister in the vehicle;

said mounting flange comprising a bendable hinge leaf which supports said door panel for pivotal movement about an axis said hinge leaf having a pivotal portion with opposite side edges, one of said side edges extending alongside said axis, the other of said side edges being skewed relative to said axis;

said mounting flange further comprising a stress riser which is rupturable under stress induced in said pivotal portion of said hinge leaf by said pivotal movement of said door panel about said axis.

13. Apparatus as defined in claim 12 further comprising a separate stress riser which holds said door panel in a closed position and which is rupturable under stress induced by inflating movement of the restraint, said separate stress riser being spaced fully from said stress riser at said mounting flange.

14. Apparatus as defined in claim 12 wherein said inner and outer side surfaces of said door panel are bounded by a peripheral edge surface of said door panel which extends entirely around said door panel.

15. Apparatus as defined in claim 14 wherein said stress riser is spaced fully from said peripheral edge surface of said door panel.

16. Apparatus as defined in claim 15 wherein said mounting flange is spaced fully from said peripheral edge surface of said door panel.

17. Apparatus as defined in claim 12 wherein said stress riser extends along said one of said side edges of said pivotal portion of said hinge leaf.

18. Apparatus as defined in claim 17 wherein said one of said side edges is spaced from said inner side surface of said door panel, said other of said side edges adjoining said inner side surface of said door panel.

19. Apparatus as defined in claim 18 wherein said one of said side edges is straight along its entire length, said other of said side edges being curved along its entire length.

20. Apparatus as defined in claim 12 wherein said stress riser is one of a pair of stress risers extending along said one of said side edges from opposite ends of said one of said side edges.

21. Apparatus as defined in claim 20 wherein said opposite ends of said one of said side edges are unequally spaced from said other of said side edges in a direction perpendicular to said axis, said pair of stress risers being unequal in length.

22. Apparatus as defined in claim 20 wherein said opposite ends of said one of said side edges are equally spaced from said other of said side edges in a direction perpendicular to said axis, said pair of stress risers being equal in length.

23. Apparatus as defined in claim 12 wherein said door panel and said mounting flange are portions of a unitary plastic part.

24. Apparatus as defined in claim 12 wherein said stress riser extends in a straight line along its entire length.

25. Apparatus as defined in claim 12 wherein said pivotal portion of said hinge leaf has first and second opposite end edges, said stress riser extending from said second end edge toward said first end edge.

26. Apparatus as defined in claim 25 wherein said pivotal portion of said hinge leaf has a first width at said first end edge and has a second, lesser width at said second end edge.

27. Apparatus for use with an inflatable vehicle occupant restraint, said apparatus comprising:

a pivotal deployment door panel; and a bendable hinge leaf supporting said door panel for pivotal movement about an axis extending along said hinge leaf between first and second ends of said hinge leaf;

said hinge leaf defining a stress riser which extends partially along said hinge leaf from said second end toward said first end, said stress riser being rupturable under stress induced by pivotal movement of said door panel about said axis.

28. Apparatus as defined in claim 27 wherein said door panel has oppositely facing inner and outer side surfaces bounded by a peripheral edge surface of said door panel which extends entirely around said door panel.

29. Apparatus as defined in claim 28 wherein said stress riser is spaced fully from said inner side surface of said door panel.

30. Apparatus as defined in claim 28 wherein said stress riser is spaced fully from said peripheral edge surface of said door panel.

31. Apparatus as defined in claim 28 wherein said hinge leaf is spaced fully from said peripheral edge surface of said door panel.

\* \* \* \* \*